July 30, 1946.  S. B. SOMERVELL  2,404,931
RECOIL MECHANISM
Filed Aug. 3, 1943  2 Sheets-Sheet 1
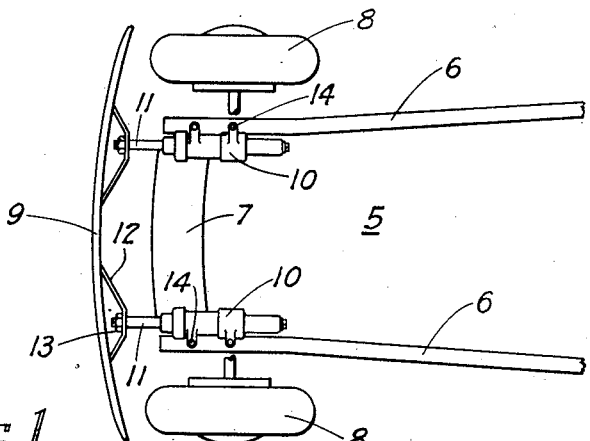
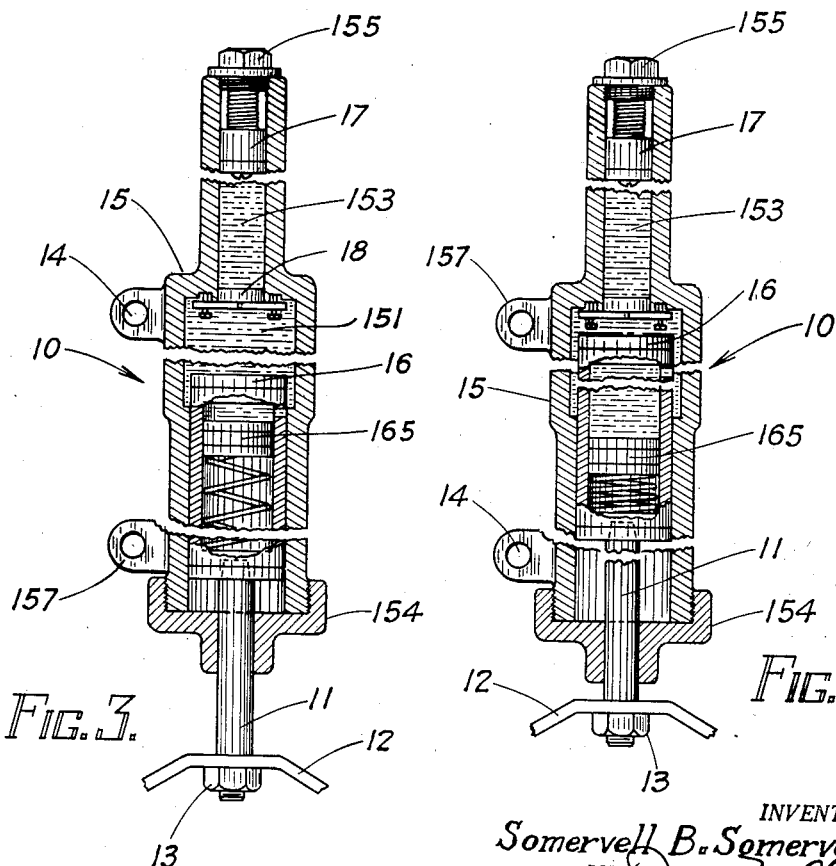
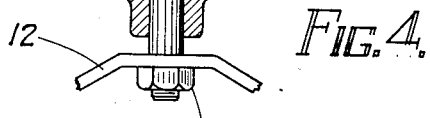
INVENTOR.
Somervell B. Somervell,
BY
His Attorney.

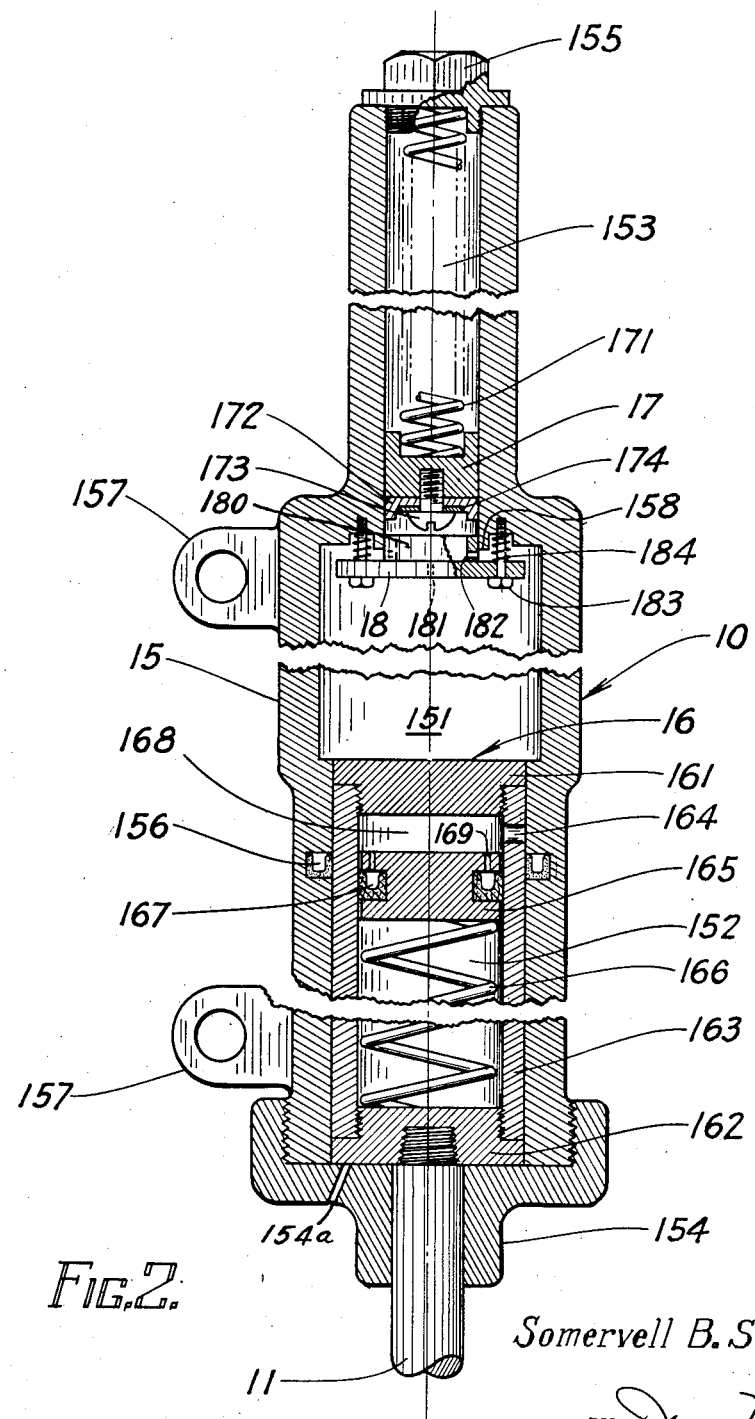

Patented July 30, 1946

2,404,931

UNITED STATES PATENT OFFICE 2,404,931

RECOIL MECHANISM

Somervell B. Somervell, New York, N. Y., assignor to Kurtiss P. Schenke, New York, N. Y.

Application August 3, 1943, Serial No. 497,269

7 Claims. (Cl. 293—55)

The present invention relates to devices for the absorbtion of impact and shock and more particularly to recoil mechanisms.

It is primarily an object of the present invention to provide a shock absorbing device including a recoil mechanism in which the dissipation of the disturbing force between its peak load and its return to zero is adequately compensated for. It is a further object to provide such a device which utilizes both springs and fluid pistons in a unique arrangement to gradually arrest the shock of the imposed force to the point of its peak load and to effectively dampen or prevent rebound when it has diminished.

A further object of this invention is the provision of a compact recoil unit which is completely housed within a cylindrical casing. It is a corollary object to provide a simple, relatively inexpensive device of this character which will remain serviceable for long periods and is readily adapted for servicing and repair.

Other objects and advantages of the present invention will become apparent to those skilled in the art after reading the present specification and the accompanying drawings forming a part hereof, in which;

Fig. 1 is a fragmentary plan view of the forward portion of an automobile chassis to which a preferred form of my invention is shown adapted;

Fig. 2 is a detailed cross-sectional view of the recoil mechanism and its working parts;

Fig. 3 is a cross-sectional view of the mechanism to a reduced scale showing the parts partially compacted; and Fig. 4 is a similar cross-sectional view showing the parts fully compacted.

Referring now to Fig. 1, the numeral 5 represents an automobile or other vehicle having a chassis or undercarriage frame which consists of the side frames 6 and the cross frame 7. The two front wheels 8 are rotatably mounted in any suitable manner known to the art and the bumper 9 extends across the front of the chassis. The bumper 9 is resiliently supported from the main chassis frame by the recoil mechanisms 10, which include the forwardly extending piston rods 11 attached to the bumper brackets 12 by the nuts 13, the recoil cylinders 10 being suitably attached to the frame by the bolts 14. It will be apparent that a collision between the vehicle 5 and another object, either fixed or moving, which might strike the bumper 9, would cause relative telescopic movement between the piston 11 and its respective cylinder 10.

Reference to Fig. 2, indicates that the recoil mechanism 10 comprises a cylinder body 15 having a central chamber 151, a lower or inner chamber 152 of slightly lesser diameter, and an upper or outer chamber 153 of appreciably lesser diameter. The lower chamber 152 is defined by the cap fitting or gland 154 which is suitably bored to permit guided sliding of the rod 11 therethrough and its counterbored portion is threaded to engage the threaded exterior of the cylinder end. The opposite or outer end of the cylinder body is closed, and the chamber 153 formed by the plug 155 which threadedly engages the interior of the cylinder end and is provided with a hexagonal nut portion to facilitate its removal or installation. Within the wall of the cylinder body 15 adjacent the chamber 152 there is provided a packing ring 156 and the shouldered portion of the cylinder body 15 where the chambers 151 and 153 meet is suitably counterbored to provide a valve seat 158. Apertured lugs or ears 157 extend from the cylinder body for its attachment by the abovementioned bolts 14 to the chassis frame.

The inner chamber 152 is fully occupied by the main piston assembly 16 having the head and base elements 161 and 162, respectively, each of which are threadedly attached to the piston wall element 163. The actuating rod 11 threadedly engages the base element 162 and in the undeflected condition of the mechanism the latter is preferably in contact with the end wall of the cap element 154 and the head element 161 defines the lower end of the central chamber 151. The piston wall 163 is provided with a port 164 adjacent its upper end and the piston assembly 16 houses an internal floating piston 165, continually urged upwardly and outwardly by the compression spring 166 and sealed therebetween by the packing ring 167. The floating piston 165 in cooperation with its moving cylinder wall 163 and the piston head 161 forms the floating fluid chamber 168 and the packing ring 167 is maintained in pressure contact with the tubular walls of the floating cylinder 163 by means of the communicating passages or ports 169 which are open to the chamber 168.

The small bore chamber 153 is sealed at its lower portion, in the undeflected condition of the device by the floating piston 17 urged inwardly by the compression spring 171, the terminals of which are in contact with the cupped or counterbored portions of the piston 17 and the outer plug 155. The piston 17 is made tight within its cylindrical bore by the cup washer 172 held by the retaining screw 173 in contact with the metallic ring washer 174, the piston defining the outer end of the fluid portion of the chamber 153 which is in communication with the fluid in the central chamber through the intermediacy of the metering flap valve 18.

The valve 18 comprises essentially a circular plate or disc having a central metering orifice therethrough at 181 and an integral cylindrical portion 180 reciprocable within the end bore of the outer fluid cylinder within which cylinder portion 180 it is provided with bleeding ports 182. The valve 18 is guided in its short reciprocable movement by the tap bolts 183 threadedly engaging the cylinder body 15 and resiliently held from its seat 158 thereon by the light compressing springs 184 concentrically disposed about the guide bolts 183. In the normal or undeflected condition of the mechanism as shown in Fig. 2, all of the interior spaces between the floating pistons 165 and 17 including the central chamber 151 would be filled with oil or other suitable shock absorber fluid and a filling duct and plug, not shown, would preferably be provided in communication with the central chamber 151 for purposes of filling, draining or replenishing.

The operation of the device is as follows: Let us assume that the recoil mechanism units 10 to be installed in an automobile as shown in Fig. 1, and to be in its normal condition with its elements disposed as in Fig. 2 and the bumper 9 is subjected to a shock or impact of appreciable magnitude. The shock results in relative and opposite movement between the bumper 9 and the units 10 and corresponding telescopic movement of the intermediate piston 11 thru the guide cap 154 and outward movement of the piston assembly 16. The latter passes into the central fluid chamber 151 carrying with it the inner floating piston 165 which maintains its relative position within the piston assembly as long as the port 164 is covered by the walls of the cylinder 163.

Initial movement of the piston 16 into the chamber 151 results in the development of pressure in the fluid therein which passes through the restricted orifice 181 and bleeds also through the ports 182, entering the outer fluid chamber 153 and building up fluid pressure against the face of the smaller floating piston 17. In such a partially deflected condition of the recoil unit the elements will pass through a relative position in respect to the body 15 as indicated in Fig. 3. In this figure it will be seen that the piston 16 has entered the chamber 151 sufficiently to displace fluid and build up pressure therein causing the valve 18 to close ports 182; and the fluid which has passed therethrough, and continues to pass thru the metering orifice 181, has partially filled the outer chamber 153 imparting outward movement to the piston 17 against the resistance of its spring 171. The shock has not as yet, however, been of such magnitude to cause telescoping or compacting to the extent that the port 164 would be uncovered. Should this have been the full extent of the shock and it were fully dissipated by movement of the elements to the position shown in Fig. 3, the energy stored in the spring 171 would urge the piston 17 to return inwardly, the resulting pressure differential between the chambers 153 and 151 again opening the valve 18, with the assistance of the springs 184. The return of the fluid into the chamber 151 will cause the piston assembly to return to its undeflected position against the end cap 154. An air vent 154a of any suitable type is preferably provided thru the end cap 154 to relieve the pressure or vacuum created between the cap and the base element 162 as the piston assembly moves in either direction.

Let us now assume that the disturbing force or shock was of sufficient magnitude to cause complete deflection or compacting of the recoil unit. This greater force causes the piston assembly 16 to project beyond the position shown in Fig. 3 in which the piston 17 has almost reached its farthest outward position. Slightly further movement of the piston assembly 16, and the piston 17, results in exposure of the port 164 to the fluid pressure which has been built up in the chamber 151. This opening of fluid communication between the chambers 151 and 168 results in rapid equalization of the pressures within these chambers, a material reduction in the total fluid resistance opposing further movement of the piston head 16 due to the added pressure on its under or inner face and the increase in fluid pressure upon the floating piston 165 which is increasingly opposed by deflection of the spring 166. The greater force is preferably finally dissipated by maximum deflection of the spring 166 at which time the elements attain a relative position as shown in Fig. 4. The recoil unit is preferably designed such that a still greater force will cause the piston end 16 to physically contact the guide bolts 183 thereby providing a solid metallic assembly from the bumper, through the rod 11, the piston assembly 16, the bolts 183, through the body 15 and the lugs 157 to the chassis frame.

The functioning of the valve 18 is as follows: As the piston 16 moves into the chamber 151 the fluid displaced thereby initially passes through the restricted ports 181 and 184 moving the piston 17 against the opposition of the spring 171. The resistance offered by these ports causes a building up of pressure within the chamber 151 which acts upon the face of the valve 18 having the greatest exposed area to the increased pressure with the result that the valve 18 seats itself against the annular lip 158, overcoming the resistance of the springs 184 and closing off the ports 182. Continued movement of the piston 16 causes the displaced fluid to be metered entirely through the port 181 and further movement of the piston 17 at an appreciably higher rate than the piston 16 in proportion to the relative exposed areas. By the time the port 164 becomes exposed to the chamber 151 the piston 17 will have reached the limit of its outward movement fully compressing the spring 171. The remainder of the disturbing shock is absorbed by the second floating piston 165 as described above.

Upon removal of the disturbing shock or force the normal condition of the recoil unit is again restored by movement of the elements in the reverse order and direction to those which have been enumerated above. The spring 166, being more powerful than the spring 171 will impart outward movement of the piston 165, expelling fluid from the chamber 168, through the port 164 into chamber 151. As this movement of the fluid takes place the entrance of the fluid into the chamber 151 causes return movement of the piston assembly 16 until the port 164 is again closed, at which time the spring 166 is no longer effective to cause further return movement of the piston assembly. At this point however, energy stored within the smaller spring 171 exerts a greater force upon the piston 17 than the opposing force of the fluid in chambers 151 and 153, which have now been relieved of the force exerted by the spring 166. Since the pressure within chamber 153 is greater than that in chamber 151 the springs 184 now assist in returning the valve 18 to its initial position in which the fluid is permitted to pass through the orifices 181 and 182 until the recoil mechanism has slowly been returned to its extended initial position without the attendance of rebounding characteristics. The units are then in position to again oppose further disturbing impacts or shocks.

Other forms and modifications of the present invention, both with respect to its general arrangement and the details of the respective elements which may occur to those skilled in the art after reading the foregoing description, are all intended to fall within the scope and spirit of the present invention as more particularly defined in the appended claims.

I claim:

1. A recoil mechanism for a motor vehicle having a bumper and a chassis frame comprising a multi-chambered cylinder attached to said frame, a hollow piston reciprocable within a chamber of said cylinder, an impact transmitting element connecting said bumper with said hollow piston, a resiliently opposed floating piston reciprocable within a further chamber of said cylinder, a main fluid chamber in said cylinder, a second floating piston resiliently carried within said hollow piston, restricting means disposed between said first floating piston and said main chamber adapted to initiate absorption of initial movement of said hollow piston upon transmission of an impact thereto and porting means cooperating with said main chamber initiated by further movement of said hollow piston adapted to cause said second floating piston to resiliently oppose said further movement.

2. A recoil mechanism adapted to dampen shocks between a first and a second body, comprising a multi-chambered cylinder attached to said first body, a hollow piston slidable from a first into a second cylinder of said chamber, a rod attached to said hollow piston, said rod attached to the second said body, a resiliently opposed piston within a third chamber of said cylinder, a resiliently opposed piston within said hollow piston and means adapted to provide fluid communication between said chambers whereby relative movements tending to produce shocks between said second body attached rod and said first body attached cylinder are resiliently opposed in each direction.

3. The combination with a shock-absorbing device of the type having a multi-chambered cylinder and a hollow piston disposed within one of said chambers, of a floating piston carried by said hollow piston, resilient means interposed between said floating and hollow pistons, a second floating piston disposed within a second chamber, resilient means interposed between said second floating piston and said cylinder, a main fluid chamber and means initiated by movement of said floating piston into said main chamber adapted to cause said second floating piston to initially oppose the same and upon predetermined movement of said hollow piston to cause the said first floating piston to additionally resiliently oppose further movement thereof.

4. The combination with a shock-absorbing device of the type having a multi-chambered cylinder and a hollow piston normally occupying one of said chambers, of a floating piston slidable within said hollow piston, resilient means interposed between said floating and hollow pistons urging said floating piston toward a chamber within said hollow piston, a main fluid chamber and a port through the wall of said hollow piston adapted upon predetermined movement thereof into said main chamber to provide fluid communication to said chamber carried therewithin whereby said floating piston opposes further movement of said hollow piston.

5. A recoil mechanism comprising a cylinder having at least three fluid chambers including a main chamber, a secondary chamber adjacent to and of lesser diameter than said main chamber and a tertiary chamber of lesser diameter than said secondary chamber, a hollow piston normally fully occupying said secondary chamber, a spring-pressed piston within said tertiary chamber, valve means interposed between said main and tertiary chambers, a spring-pressed piston carried within said hollow piston, actuating means attached to said hollow piston and slidable through a wall of said cylinder and a port through the wall of said hollow piston whereby forces imposed upon said actuating means causes restricted fluid displacement from said main chamber against the piston in said tertiary chamber through said valve means and predetermined sliding travel of said hollow piston exposes the spring-pressed piston carried therewithin to the pressure of the fluid in said main chamber through said port.

6. A shock-absorbing device comprising a multi-chambered cylinder attached to a relatively fixed member, a hollow piston reciprocable within a chamber of said cylinder, a relatively movable impact transmitting element connected to said hollow piston, a resiliently opposed floating piston reciprocable within a further chamber of said cylinder, a main fluid chamber in said cylinder, a second floating piston resiliently carried within said hollow piston and restricting means disposed between said first floating piston and said main chamber adapted to initiate absorption of initial movement of said hollow piston upon transmission of an impact thereto and porting means cooperating with said main chamber initiated by further movement of said hollow piston adapted to cause said second floating piston to resiliently oppose said further movement.

7. A shock absorbing device having a multi-chambered cylinder member attached to a relatively fixed support, a hollow piston normally occupying one of the chambers of said cylinder member, a floating piston slidable within said hollow piston, resilient means interposed between said floating and hollow pistons urging said floating piston toward a chamber within said cylinder member, a port through the wall of said hollow piston adapted upon predetermined movement thereof into said main chamber to provide fluid communication to said chamber carried therewithin whereby said floating piston opposes further movement of said hollow piston within said relatively fixed cylinder member.

SOMERVELL B. SOMERVELL.